US010176201B2

(12) United States Patent
Johnson

(10) Patent No.: US 10,176,201 B2
(45) Date of Patent: Jan. 8, 2019

(54) CONTENT ORGANIZATION AND CATEGORIZATION

(71) Applicant: Aaron Johnson, Orem, UT (US)

(72) Inventor: Aaron Johnson, Orem, UT (US)

( * ) Notice: Subject to any disclaimer, the term of this patent is extended or adjusted under 35 U.S.C. 154(b) by 239 days.

(21) Appl. No.: 14/886,995

(22) Filed: Oct. 19, 2015

(65) Prior Publication Data

US 2016/0110031 A1 Apr. 21, 2016

Related U.S. Application Data

(60) Provisional application No. 62/065,290, filed on Oct. 17, 2014.

(51) Int. Cl.
*G06F 17/30* (2006.01)

(52) U.S. Cl.
CPC .... *G06F 17/3028* (2013.01); *G06F 17/30038* (2013.01)

(58) Field of Classification Search
CPC .......... G06F 17/3028; G06F 17/30038; G06F 17/218; G06F 17/30268; G06F 17/30752; G06F 17/3082; G06F 17/30911; H04L 51/32; H04W 4/21; G06Q 50/01
See application file for complete search history.

(56) References Cited

U.S. PATENT DOCUMENTS

| 8,200,247 B1* | 6/2012 | Starenky | G01C 21/28 455/456.3 |
| --- | --- | --- | --- |
| 2009/0106279 A1* | 4/2009 | Bae | G06F 17/30038 |
| 2011/0010388 A1* | 1/2011 | MacLaurin | G06F 3/0482 707/769 |
| 2011/0312424 A1* | 12/2011 | Burckart | H04N 21/4788 463/42 |
| 2012/0072419 A1* | 3/2012 | Moganti | G06F 17/30038 707/737 |
| 2012/0151398 A1* | 6/2012 | Foy | G06F 17/30268 715/769 |
| 2014/0108842 A1* | 4/2014 | Frank | G06F 17/28 713/323 |
| 2014/0181089 A1* | 6/2014 | Desmond | G06F 17/30268 707/722 |
| 2014/0380420 A1* | 12/2014 | Wang | G06F 17/30268 726/4 |
| 2016/0085863 A1* | 3/2016 | Allen | G06Q 30/08 707/754 |

* cited by examiner

*Primary Examiner* — Daniel Samwel
(74) *Attorney, Agent, or Firm* — Kunzler, PC

(57) ABSTRACT

Apparatuses, methods, program products, and systems are disclosed for content organization and categorization. An apparatus includes a tag module that presents a plurality of graphical tags for a content element. The one or more graphical tags include information related to the content element. An apparatus includes an assignment module that associates one or more graphical tags with the content element in response to user input. An apparatus includes a grouping module that indexes one or more content elements based on the one or more graphical tags. Content elements that have the same graphical tag are grouped together.

14 Claims, 8 Drawing Sheets

CONTENT ORGANIZATION AND CATEGORIZATION

CROSS-REFERENCES TO RELATED APPLICATIONS

This application claims the benefit of U.S. Provisional Patent Application No. 62/065,290 entitled "CONTENT ORGANIZATION AND CATEGORIZATION" and filed on Oct. 17, 2014, for Aaron Johnson, which is incorporated herein by reference.

FIELD

This invention relates to digital content and more particularly relates to categorizing and organizing digital content.

BACKGROUND

Digital content such as images, videos, audio files, documents, etc. may be generated by users on various devices—smart phones, tablet computers, wearable devices, or the like. A user's digital content may be stored in a content library, which may include various directories, folders, or the like that each include digital content. As the amount of a user's digital content increases, it can become difficult to manage and organize the user's content library. Trying to find a content element within the user's content library can be even more challenging as the content library becomes disorganized.

SUMMARY

An apparatus for content organization and categorization is disclosed. A system, program product, and method also perform the functions of the apparatus. An apparatus, in one embodiment, includes a tag module that presents a plurality of graphical tags for a content element. In some embodiments, the one or more graphical tags include information related to the content element. An apparatus, in another embodiment, includes an assignment module that associates one or more graphical tags with the content element in response to user input. In some embodiments, an apparatus includes a grouping module that indexes one or more content elements based on the one or more graphical tags. Content elements that have the same graphical tag may be grouped together.

An apparatus, in a further embodiment, includes an action module that performs an action associated with a graphical tag in response to the tag module associating the graphical tag with the content element. In certain embodiments, the tag module selects one or more graphical tags for the content element based on one or more characteristics of the content element. In some embodiments, the apparatus includes a recommendation module that recommends one or more graphical tags based on one or more of a user's location and one or more characteristics of the content element.

In one embodiment, one or more graphical tags become available in response to a user completing one or more tasks associated with the one or more graphical tags. In another embodiment, the content element is one of a plurality of content elements comprising a collection. The graphical tag may be associated with each content element in the collection in response to the graphical tag being associated with the collection. In various embodiments, the plurality of graphical tags include one or more of predefined graphical tags and user-created graphical tags.

In one embodiment, a graphical tag comprises one or more sub tags. The one or more sub tags may be associated with a content element in response to the graphical tag being associated with the content element. In a further embodiment, the tag module arranges the plurality of graphical tags into one or more tag categories based on a graphical tag type. In certain embodiments, the one or more graphical tags represent an action in a game. In some embodiments, the apparatus includes a tag generation module that creates a graphical tag comprising one or more characteristics selected by a user. In various embodiments, the content element comprises one or more of a photograph, a video, an audio file, and a document.

A method, in one embodiment, includes presenting a plurality of graphical tags for a content element. The one or more graphical tags may include information related to the content element. In certain embodiments, the method includes associating one or more graphical tags with the content element in response to user input. In another embodiment, the method includes indexing one or more content elements based on the one or more graphical tags. Content elements that have the same graphical tag may be grouped together.

In a further embodiment, the method includes performing an action associated with a graphical tag in response to the tag module associating the graphical tag with the content element. In one embodiment, the method includes selecting one or more graphical tags for the content element based on one or more characteristics of the content element. In various embodiments, the method includes recommending one or more graphical tags based on one or more of a user's location and one or more characteristics of the content element.

In one embodiment, one or more graphical tags become available in response to a user completing one or more tasks associated with the one or more graphical tags. In a further embodiment, the content element is one of a plurality of content elements comprising a collection. The graphical tag may be associated with each content element in the collection in response to the graphical tag being associated with the collection.

A computer program product, in one embodiment, includes a computer readable storage medium having program code embodied therein. In one embodiment, the program code is readable/executable by a processor for presenting a plurality of graphical tags for a content element, the one or more graphical tags comprising information related to the content element. In another embodiment, the program code is readable/executable by a processor for associating one or more graphical tags with the content element in response to user input. In certain embodiments, the program code is readable/executable by a processor for indexing one or more content elements based on the one or more graphical tags. Content elements that have the same graphical tag may be grouped together. In a further embodiment, the program code is readable/executable by a processor for performing an action associated with a graphical tag in response to the tag module associating the graphical tag with the content element.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Figure 1:
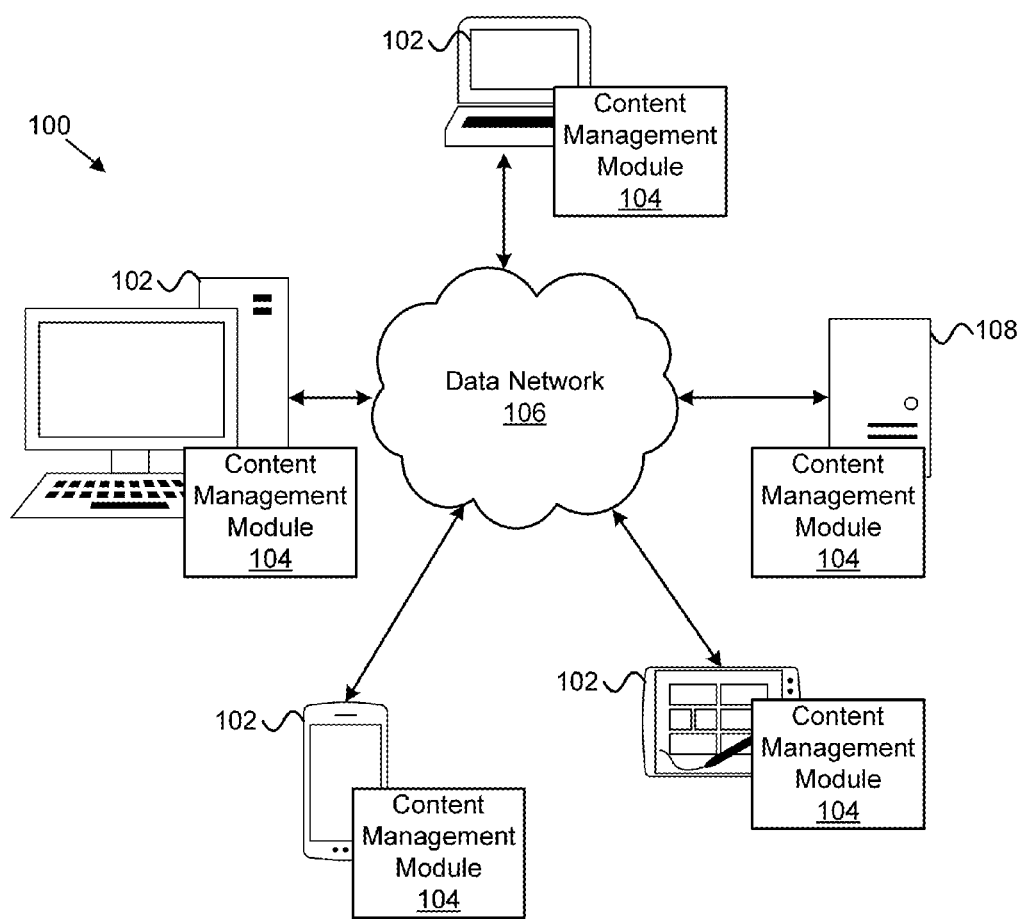
FIG. 1 is a schematic block diagram illustrating one embodiment of a system for content organization and categorization.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 illustrates one embodiment of a system 100 for content organization and categorization. The system 100 includes electronic devices 102, content management modules 104, data networks 106, and servers 108, which are described in more detail below.

The electronic devices 102, in one embodiment, include information handling devices, such as laptop computers, tablet computers, smart phones, wearable devices (e.g., smart watches, optical head-mounted displays), and/or the like. Additionally, the electronic devices 102 may execute various operating systems, such as different versions of mobile and desktop operating systems provided by Microsoft®, Apple®, Linux®, Android®, and/or the like. For example, the client devices 102 may include a laptop computer executing a version of Apple OSX®, Microsoft Windows®, UNIX®, Linux, or the like. In certain embodiments, the electronic devices 102 execute one or more different applications running within the operating systems. The electronic devices 102 may also have various software and/or hardware configurations, which may include various methods of connecting to a data network 106, including Ethernet, Wi-Fi, Bluetooth®, near-field communication (NFC), and/or the like. The electronic devices 102 may include storage media for storing digital content, such as images, videos, documents, etc.

The system 100, in certain embodiments, includes one or more content management modules 104. In some embodiments, the content management modules 104 are configured to present one or more graphical tags related to content. In various embodiments, the content management modules 104 are configured to select one or more graphical tags in response to user input and associate the selected graphical tags with the content. The content management modules 104, in a further embodiment, are configured to group, categorize, index, or the like content based on the graphical tags. In certain embodiments, at least a portion of the content management module 104 is located on a server 108 that performs one or more operations of the content management module 104. The content management module 104 is described in more detail below with reference to FIGS. 2 and 3.

The system 100, in one embodiment, includes a data network 106. The data network 106 may be a digital communication data network that transmits digital communications between the electronic devices 102 and/or servers 108. The data network 106 may include a wireless network, such as a wireless telephone network, a local wireless network, such as a Wi-Fi network, a Bluetooth® network, a near-field communication (NFC) network, and the like. The data network 106 may include a wide area network (WAN), a storage area network (SAN), a local area network (LAN), an optical fiber network, the Internet, an intranet, or other network known in the art. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the system 100 includes one or more servers 108. The servers 108 may include main frame computers, desktop computers, laptop computers, cloud servers, virtual servers, smart phones, tablet computers, and/or the like. The servers 108 may include computer readable storage media, such as hard disk drives, optical drives, non-volatile memory, RAM, or the like. Additionally, the servers 108 can be configured to store data in one or more data storage areas associated with the computer readable storage media, such as digital photographs, videos, audio files, documents, application data, and/or the like.

The electronic devices 102, in certain embodiments, are communicatively coupled to the servers 108 through the data network 106. Moreover, the electronic devices 102 access data stored on the servers 108 through the data network 106. In some embodiments, the servers 108 are communicatively coupled to other servers 108 through the data network 106. The servers 108 may comprise a storage area network (SAN), a cluster, a cloud computing environment, and/or the like. The servers 108 may comprise email servers, application servers, game servers, web servers, media servers, and/or the like.

Figure 2:
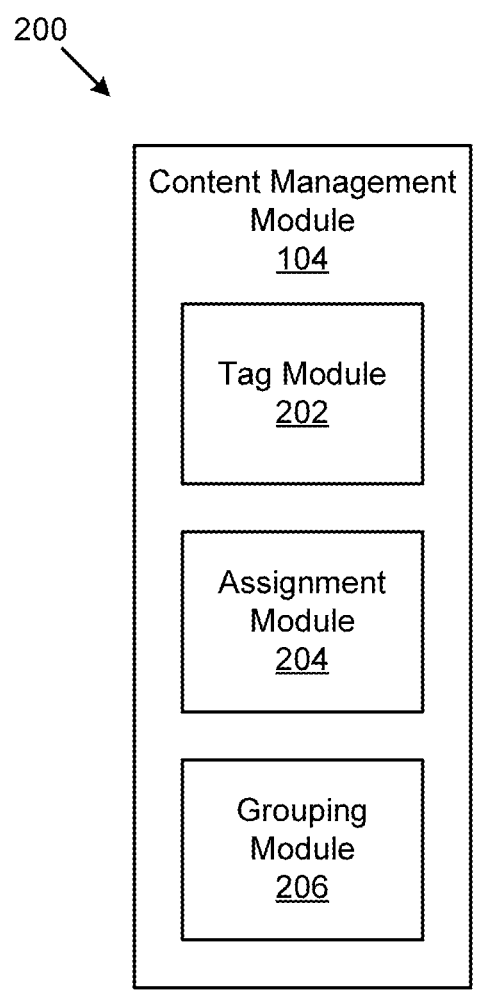
FIG. 2 is a schematic block diagram illustrating one embodiment of a module for content organization and categorization.

FIG. 2 illustrates one embodiment of a module 200 for content organization and categorization. The module 200, in certain embodiments, includes an implementation of a content management module 104. In some embodiments, the content management module 104 includes a tag module 202, an assignment module 204, and a grouping module 206, which are described in more detail below.

In one embodiment, the tag module 202 is configured to present one or more graphical tags. As used herein, graphical tags are graphical representations of metadata, information, tags, actions, categories, or the like. The graphical representations may comprise icons, images, badges, or the like. For example, a graphical tag may represent a family member, a pet, a group, an organization, a location, an event, or the like. In some embodiments, graphical tags are assignable to, or otherwise capable of being associated with, one or more content elements, such as images, videos, audio files, documents, emails, or the like. The one or more content elements may be stored in a content library comprising one or more directories, folders, libraries, or the like stored at a single electronic device 102 or stored at various electronic devices 102. For example, a user may store photos in a cloud server and documents on a local desktop computer.

In certain embodiments, graphical tags include one or more interactive multimedia content elements such as an audio track, an image, a video, a gif, or the like such that when a user interacts with the graphical multimedia tag, the multimedia is displayed, played, or the like. In some embodiments, graphical tags include one or more interactive content elements such as hyperlinks, buttons, games, or the like. For example, a graphical tag may include a button that comprises a hyperlink to a web page. When the button is pressed, the web page directed to by the hyperlink may be loaded in a web browser.

The tag module 202, in some embodiments, presents a graphical tag as various shapes, sizes, colors, or the like. In certain embodiments, a graphical tag includes one or more sub tags. For example, a "sport" tag may include sub tags of particular sports, such as a "baseball" tag, a "basketball" tag, etc. such that when the "sport" tag is assigned to a content element, each of its sub tags, or one or more user-selected sub tags, are also assigned to the content element.

In certain embodiments, a graphical tag includes an associated action, as described in more detail below with reference to the action module 302. An action may be initiated automatically in response to a graphical tag being added to a content element. In some embodiments, an action is initiated in response to a user interacting with the graphical tag. An action may include opening a web page, prompting a user for input, playing an audio track, setting a security setting for the content, displaying additional information, sharing content on a social network, and/or the like.

In a further embodiment, the tag module 202 presents a list of available graphical tags that a user may select from in order to associate a graphical tag with a content element. The tag module 202, in one embodiment, presents one or more general-use graphical tags. General-use graphical tags may comprise default graphical tags that are not created by a user nor created based on a particular content element. For example, general-use graphical tags may comprise tags for basic information such as a date tag, a location tag, a file type tag, and/or the like. In a further embodiment, the tag module 202 presents one or more graphical tags that have been created by a user. In various embodiments, the tag module 202 presents one or more graphical tags that have been generated in response to one or more characteristics of the content the graphical tags are being associated with. The tag module 202 may organize the available graphical tags into different categories based on types of content, categories, groups, people, locations, or the like.

In certain embodiments, one or more graphical tags may be hidden, private, or otherwise unavailable until a user performs or completes various tasks, projects, surveys, or the like. For example, graphical tags associated with a video game may not be available until the user plays and progresses through the video game, or achieves certain goals within the video game. Similarly, location-based graphical tags may not be available until the user visits certain locations. For example, graphical tags that represent New York City, or particular attractions within New York City, may not be available until the tag module 202 determines the user has visited the attractions (based on GPS, or the like).

In some embodiments, the tag module 202 presents one or more graphical tags based on a location of a user or a user's device. For example, the tag module 202 may present one or more Disney®-themed graphical tags in response to determining that a user is at a Disneyland® theme park. In such an embodiment, the graphical tags may be associated with one or more attractions at the theme park, one or more Disney® characters, or the like. A user, for example, may take a picture of their daughter with Cinderella and add a Cinderella-themed graphical tag to the image. In a similar embodiment, the tag module 202 presents one or more graphical tags as part of a tour, such as a sightseeing tour. For example, the tag module 202 may determine that the user is in New York City and may present one or more graphical tags associated with attractions within the city, such as the Statue of Liberty, the Empire State Building, or the like.

In such an embodiment, the graphical tags may be used as part of a game, such as a treasure hunt, a scavenger hunt, or the like. For example, the tag module 202 may present one or more graphical tags for a scavenger hunt in a city, such as New York City. The scavenger hunt may comprise visiting ten attractions within the city and collecting a graphical tag for each attraction when it is visited. A graphical tag, for example, may represent the Statue of Liberty, which the user may assign to an image the he takes of the Statue of Liberty. In certain embodiments, the tag module 202 only allows such graphical tags to be added to an image if the user is physically at the location, e.g., the Statue of Liberty graphical tag is only accessible if the user is physically at the Statue of Liberty. The tag module 202 may determine the user's location using one or more location services, triangulation methods, or the like. The tag module 202 may present a new graphical tag as an incentive or a reward for completing the scavenger hunt by visiting all the attractions. In some embodiments, graphical tags may be traded, exchanged, bought, sold, used as an element in a game, or the like. For example, a user may sell graphical tags that they have earned or created, or buy graphical tags that may be rare or hard to find. Graphical tags may also be associated with affiliates, advertisers, companies, organizations, and/or the like.

In some embodiments, the tag module 202 presents graphical tags that comprise a user's personal or business information. For example, the tag module 202 may present a "business card" graphical tag that comprises the user's personal information, such as a name, a phone number, an address, and/or the like. In certain embodiments, the information contained in a user's personal graphical tag may be configured by the user. In some embodiments, a user's personal graphical tag may be exchanged with other users. Alternatively, a user's personal graphical tag may be automatically accessed by other users, e.g., via a transfer action such as tapping two smart devices together or using a proximity scan to sense other personal graphical tags that may be available. In this manner, personal graphical tags, as well as other graphical tags, may be instantly transferred, including the information associated with the personal graphical tag. Personal graphical tags may also be used to cross "tag" users in a network in the event that media and/or other shared information was made public.

In one embodiment, the assignment module 204 is configured to associate, assign, or otherwise relate the one or more selected graphical tags with a content element. In certain embodiments, the assignment module 204 associates a graphical tag with a content element in response to user input. For example, a user may select a graphical tag, as presented by the tag module 202, and manually assign the graphical tag with the content element. The assignment module 204 may assign a graphical tag with a content element in response to a user dragging-and-dropping a graphical tag onto a content element. The assignment module 204 may also associate a graphical tag with a content element in response to the user "flicking" a graphical tag onto a content element, e.g., the user may "flick" a graphical tag onto an image using a "flicking" motion with a scroll wheel on a mouse or a finger or stylus on a touch-enabled display. In one embodiment, the assignment module 204 may associate a graphical tag with a content element in response to a user tapping the tag. In certain embodiments, the assignment module 204 associates a plurality of graphical tags with a content element at the same time in response to a user selecting multiple graphical tags and assigning them to the content element, e.g., by dragging-and-dropping the plurality of tags on the content element.

In certain embodiments, the assignment module 204 maintains a mapping of graphical tags to various content elements that the graphical tags are associated with. In this manner, when a content element is selected to be displayed, for example, the assignment module 204 can check the map to determine which graphical tags are associated with the content element. In certain embodiments, the map may be used by a search function to find content elements that are associated with a particular graphical tag.

In one embodiment, the grouping module 206 is configured to categorize one or more content elements based on the graphical tags associated with the content elements. In certain embodiments, the grouping module 206 may associate, categorize, characterize, group, index, or the like content elements that have all been assigned the same graphical tag. For example, the grouping module 206 may group together images from a trip to New York City in response to each image having the same, or similar, graphical tag representing a trip to New York City. In another example, an image, a video, and an email that have been assigned a graphical tag representing a sporting event may be grouped together with other content having the same graphical tag.

Similarly, a subset of the same images may have graphical tags representing a visit to the Statue of Liberty, and the grouping module 206 may group together the images that have the Statue of Liberty graphical tag. In such an embodiment, the grouping module 206 may determine a content element, e.g., a single image, to represent the group of content elements, and assign a "cover" graphical tag to the collection of content elements. Thus, in this manner, a user may easily and quickly organize, categorize, and group content, such as images and videos, by adding one or more graphical tags to the content.

By grouping content based on the graphical tags associated with the content, a user may search for content based on a type, a category, or the like for the graphical tag. Referring to the previous example, a user may search for their photos and videos from their trip to New York City by selecting the graphical tag representing the trip, or entering one or more search terms, in order to retrieve content that has been grouped together using the graphical tag representing the trip to New York City. In this manner, the content management module 104 organizes and categorizes content based on the graphical tags associated with the content, and makes it easier to search for and find content.

Figure 3:
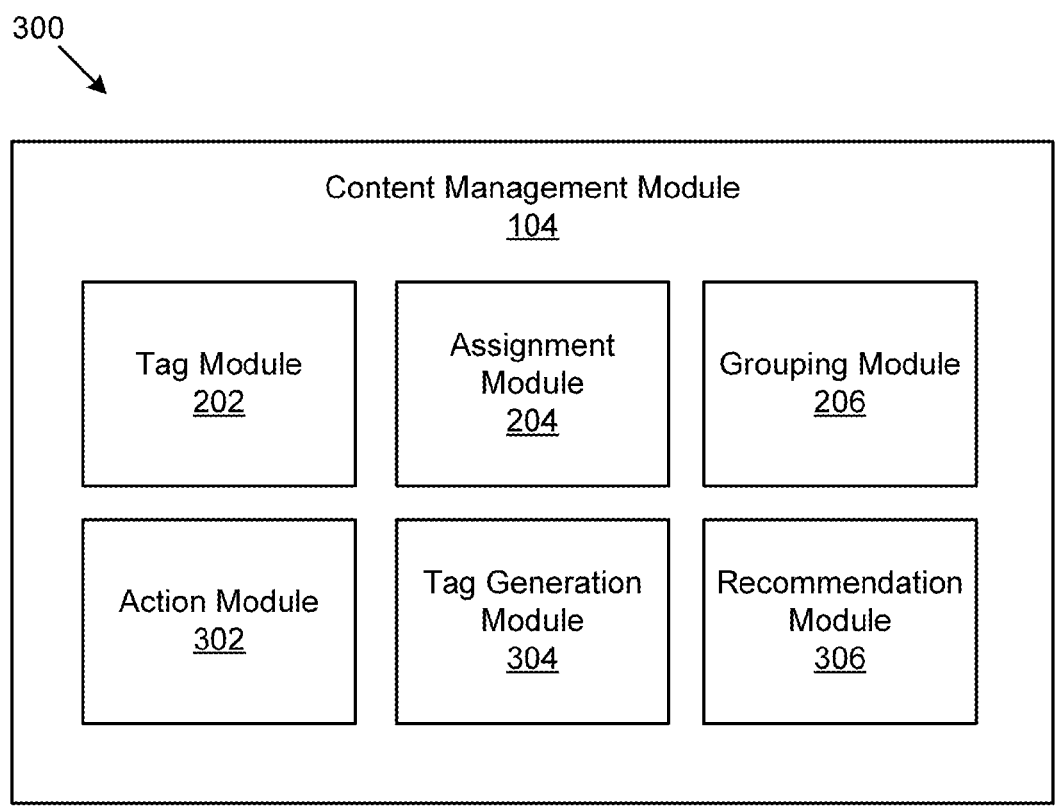
FIG. 3 is a schematic block diagram illustrating another embodiment of a module for content organization and categorization.

FIG. 3 illustrates one embodiment of a module 300 for content organization and categorization. The module 300, in certain embodiments, includes an implementation of a content management module 104. In some embodiments, the content management module 104 includes a tag module 202, an assignment module 204, and a grouping module 206, which are substantially similar to the tag module 202, the assignment module 204, and the grouping module 206 of FIG. 2. In certain embodiments, the content management module 104 includes an action module 302, a tag generation module 304, and a recommendation module 306, which are described in more detail below.

In one embodiment, the action module 302 is configured to perform an action associated with a graphical tag. In certain embodiments, the action module 302 performs an action in response to a graphical tag being associated with a content element. For example, in response to a Facebook® graphical tag being assigned to an image, the action module 302 may post the image to the user's Facebook® page. Similarly, in response to a security graphical tag being associated with a document, the action module 302 may assign a privacy setting to the document such that it may be accessed, viewed, downloaded, saved, or the like only by a user that complies with the privacy setting.

In some embodiments, the action module 302 performs an action in response to user input. For example, the action module 302 may begin playback for a slideshow comprising a group of images in response to clicking, tapping, selecting, or the like, a slideshow graphical tag. In certain embodiments, the action module 302 configures one or more actions associated with a graphical tag. Going back to the previous example, the action module 302 may configure the playback speed of the slideshow, the number of images to include in the slideshow, and/or the like.

In some embodiments, a graphical tag comprises a plurality of actions and the action module 302 determines which actions for the graphical tag are active. For example, for a graphical tag that has been assigned a social network share function, a slideshow function, and an email function, the action module 302 may activate all three functions when the graphical tag is associated with an image, but it may only activate the email function when the graphical tag is associated with a document.

In one embodiment, the tag generation module 304 is configured to generate a graphical tag. In certain embodiments, the tag module 202 provides one or more predefined graphical tags, such as general-use tags, as described above. The tag generation module 304, however, may generate custom graphical tags in response to user input. For example, the tag generation module 304 may create a custom graphical tag for an event, such as a vacation to Disneyland®, or the like. In such an embodiment, the tag generation module 304 may set various characteristics of the graphical tag in response to user input, such as an image for the tag, the size, shape, and/or color for the tag, and/or the like. In some embodiments, the tag generation module 304 records audio and/or video and associates the recording with a graphical tag. For example, the tag generation module 304 may record a user telling a story about a family's vacation to the Grand Canyon and associate the recording with a slideshow graphical tag assigned to a plurality of images of the family's vacation.

In one embodiment, the tag generation module 304 performs facial recognition on the content and generates one or more graphical tags for each person depicted in the content. For example, the tag generation module 304 may generate a graphical tag for each person in a family photo, if one has not yet been created, and may use each persons' face as an avatar for the graphical tags.

In a further embodiment, the tag generation module 304 assigns an action to a graphical tag. In some embodiments, the tag generation module 304 assigns an action to a graphical tag in response to a user selecting one or more predefined actions to assign to the graphical tag. For example, the tag generation module 304 may assign a social networking sharing action with a graphical tag in response to a user specifying one or more social networks to share the content on. In some embodiments, the tag generation module 304 may assign a plurality of actions to a graphical tag, which may be enabled and/or disabled based on the content that the graphical tag is associated with. For example, if the content is an image, a social sharing action may be enabled, while a text-edit action may be disabled.

In some embodiments, the tag generation module 304 assigns a custom action to a graphical tag. A user, for instance, may create different actions, macros, etc., and assign the actions to a graphical tag. For example, a user may predefine an action comprising the steps of sharing the content on a social network with a predefined comment or post. The user may then associate the graphical tag with an image, and when the graphical tag is associated with the image, the image may be posted to the social network with the predefined message.

In one embodiment, the recommendation module 306 is configured to recommend one or more graphical tags for content based on different characteristics of the content, such as the content type, metadata associated with the content, or the like. For example, the recommendation module 306 may recommend associating a Facebook® graphical tag, a slideshow graphical tag, a family graphical tag, and/or the like for an image. In certain embodiments, the recommendation module 306 determines the type of content being presented, such as an image, video, document, or the like, and recommends one or more graphical tags based on the content type. In some embodiments, the recommendation module 306 performs facial recognition, pattern recognition, or the like to determine one or more characteristics of the content and recommends one or more graphical tags based on the characteristics. For example, the recommendation module 306 may perform facial recognition on an image comprising a plurality of people and may recommend one or more graphical tags representing each person in the image, representing a group of persons, representing a location of the image, representing an event for the image, or the like.

In one embodiment, the recommendation module 306 monitors, tracks, learns from, and/or the like, a user's association of graphical tags with specific content. For example, if a user generally associates a Facebook® graphical tag with images, when a new image is presented, the recommendation module 306 may recommend, or automatically associate, the Facebook® graphical tag with the image. In some embodiments, the recommendation module 306 recommends one or more graphical tags based on one or more characteristics of the content. For example, the recommendation module 306 may suggest video-related graphical tags in response to the content comprising a video. Additionally, the recommendation module 306 may suggest graphical tags based on a timestamp for the content. For example, if an image was taken on the same day as images that have already been assigned graphical tags, the recommendation module 306 may suggest one or more graphical tags that were assigned to content having timestamps from the same day.

Figure 4A:
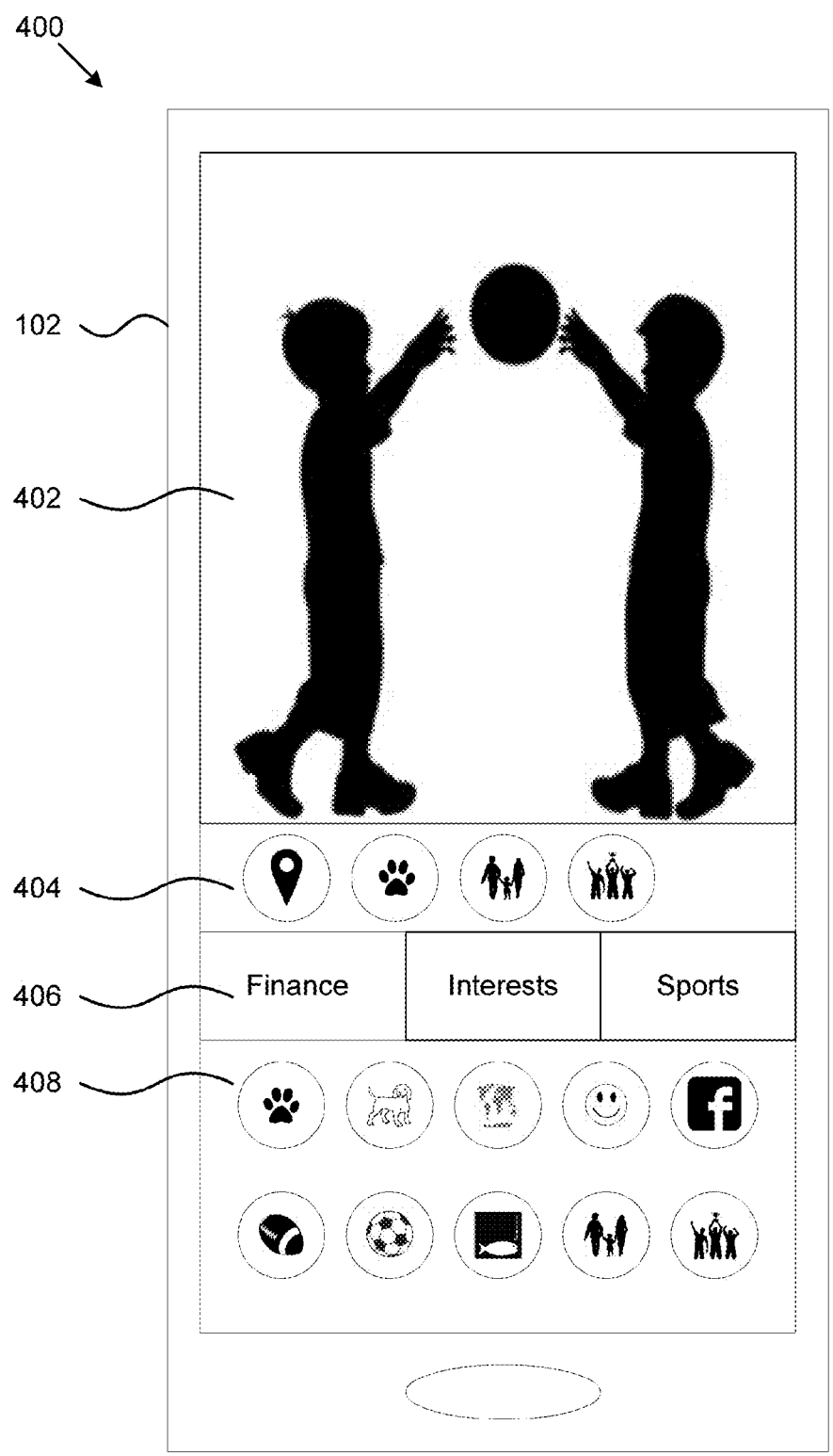
FIG. 4A illustrates one embodiment of a system for content organization and categorization.

FIG. 4A depicts one embodiment of a system for content organization and categorization. In one embodiment, the system includes an electronic device 102, such as a smart phone, that is configured to present content. In the depicted embodiment, the content comprises an image 402; however, the content may comprise a video, a document, an email, or the like. In certain embodiments, a tag module 202 presents one or more graphical tags 404 that are associated with the image 402. For example, the graphical tags 404 for the image may include a pet tag, a location tag, a music tag, or the like. The pet graphical tag, for example, may be associated with the presented image 402 and other images that include the pet. In this manner, a user may search for images that contain the pet by searching for images that have the pet graphical tag associated with the image.

In certain embodiments, the tag module 202 presents one or more available graphical tags 408 that are not currently associated with the image 402. In some embodiments, the assignment module 204 associates one or more available graphical tags 408 with an image 402 in response to user input, such as a user dragging-and-dropping a graphical tag 408 on the image 402, a user flicking a graphical tag 408 on the image, a user tapping a graphical tag 408, and so on. The tag module 402, in certain embodiments, organizes the available tags 408 by various categories 406, such as basic tags, finance tags, interest tags, family tags, sports tags, and/or the like.

Figure 4B:
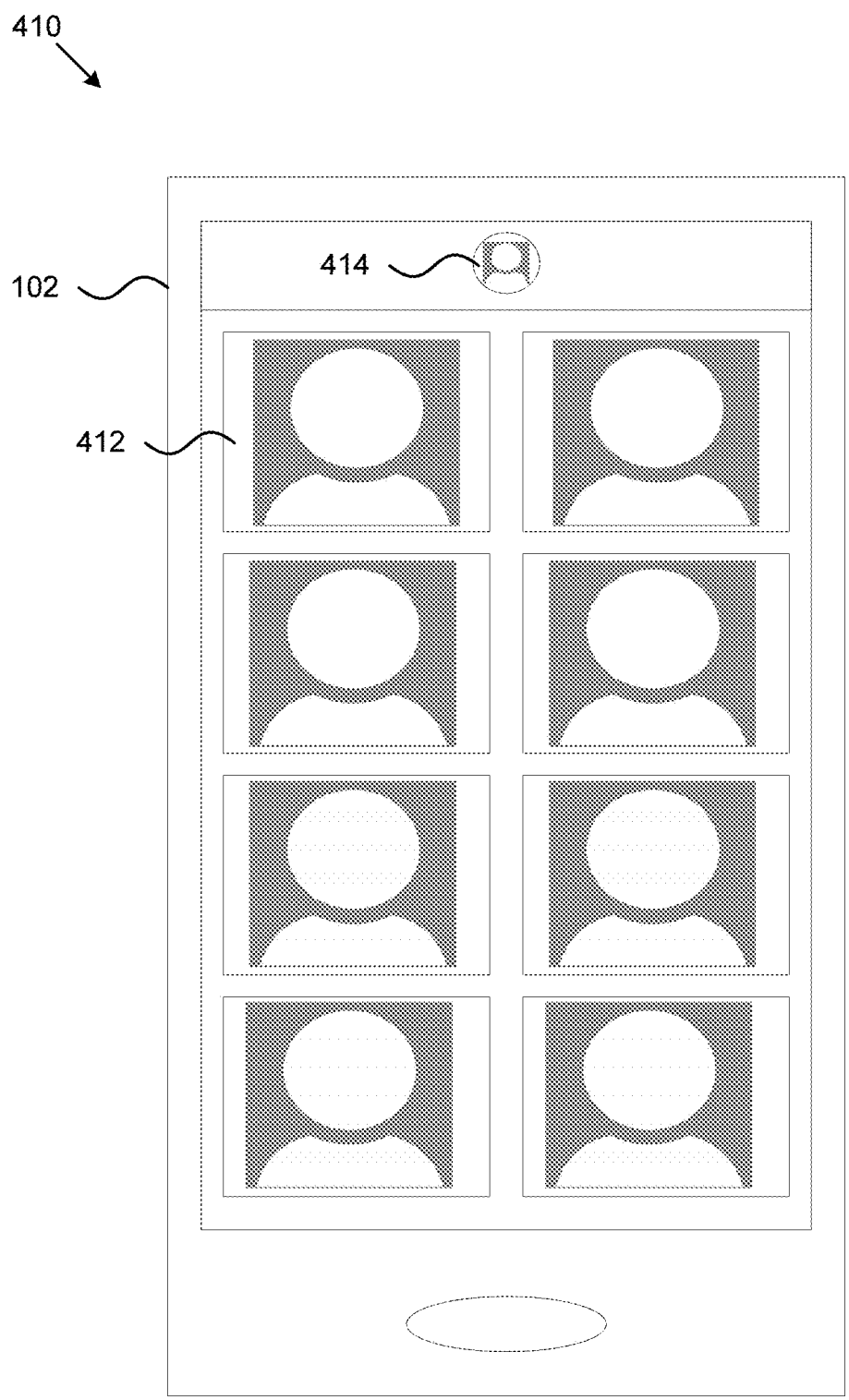
FIG. 4B illustrates one embodiment of another system for content organization and categorization.

FIG. 4B depicts one embodiment of a system 410 for content organization and categorization. In one embodiment, the system 410 depicts an electronic device 102, such as a smart phone, that is configured to present content. The content may depicted in FIG. 4B may include a plurality of images 412. The plurality of displayed images 412 may be selected in response to a particular graphical tag 414 being selected. For example, a user may wish to see all images that contain "John," or images that have been tagged with a graphical tag 414 representing "John."

In certain embodiments, the graphical tag 414 is selected from a plurality of graphical tags 414 such that the user can filter an entire image gallery or album down to a subset of images that have been tagged with the graphical tag 414. Other content may also be included, not just images, such as documents, videos, audio files, or the like. Even though only a single graphical tag 414 is used in the system 410 of FIG. 4B, in some embodiments, a plurality of graphical tags may be selected and combined to filter the image gallery. For example, a user may select a graphical tag representing "John" and a graphical tag representing "fishing" to filter the image gallery such that only images that have been tagged as "John" and "fishing" are displayed.

Figure 4C:
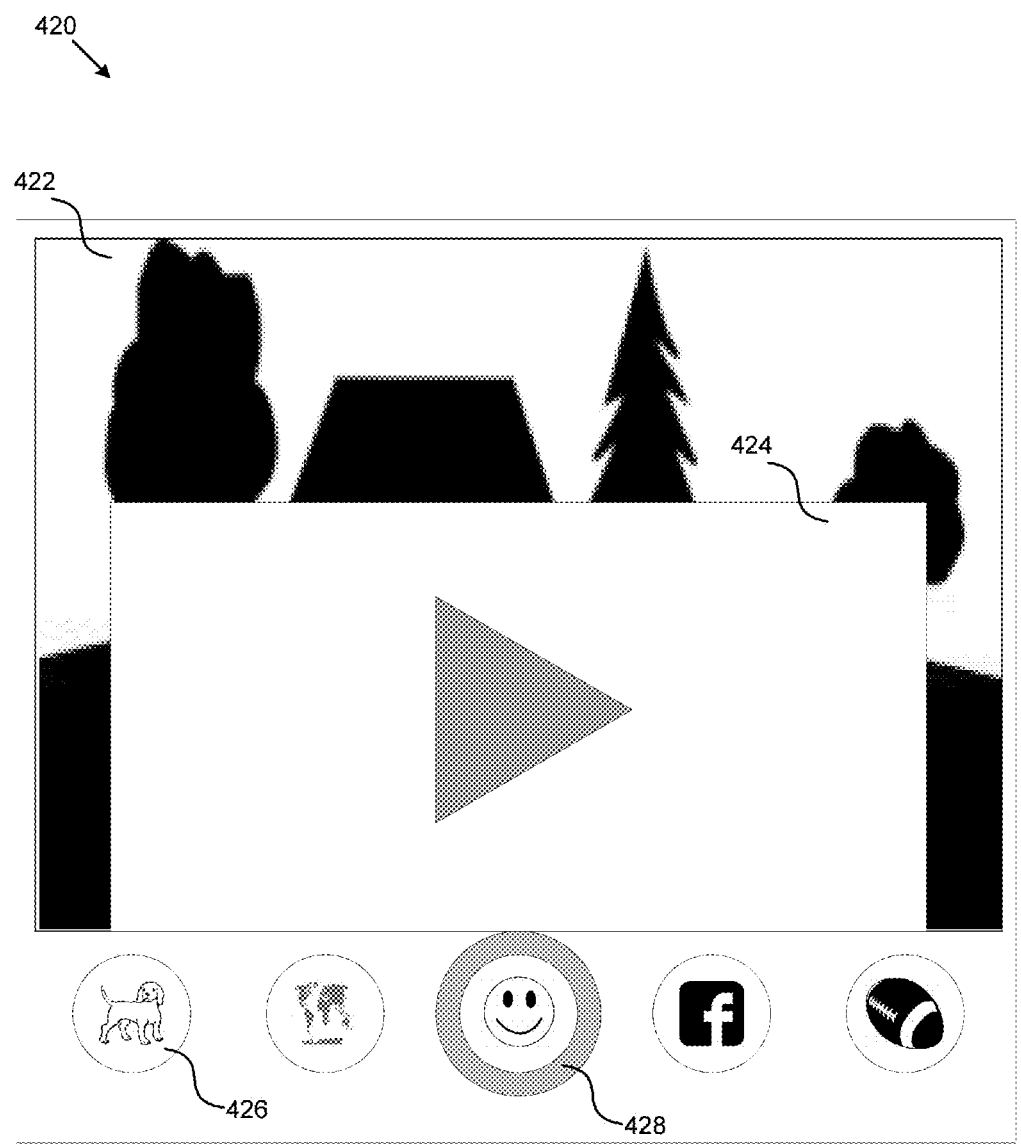
FIG. 4C illustrates one embodiment of yet another system for content organization and categorization.

FIG. 4C depicts one embodiment of a system 410 for content organization and categorization. In one embodiment, the system 420 includes a display for content 422, such as an image, with one or more graphical tags 426 that are associated with the content 422. The content 422, for example, may be presented in a web browser on a tablet computer, a smart phone, a laptop, a desktop computer, etc. The one or more graphical tags 426, as described above, may each have an action associated with it such that when a user interacts with the graphical tag 426, the action is triggered. For example, a graphical tag 428 may be clicked on, hovered over, or otherwise selected by a user, which would trigger a display and playback of a video 424 in a video player. Other examples may include a social media graphical tag, which, when selected, opens the user's social media homepage, or the like.

The system 420, in certain embodiments, comprises a web page that other users can visit. The web page may feature content 422 posted by a user, and one or more graphical tags 426 that illustrate causes, interests, products, promotions, etc., that the user is interested in, involved with, or the like. For example, the graphical tags 426 may include political tags, hobby tags, product tags, promotional tags, or the like. In this manner, the user may promote, market, or otherwise advertise various interests, organizations, products, causes, charities, etc., that the user is involved with.

Figure 5:
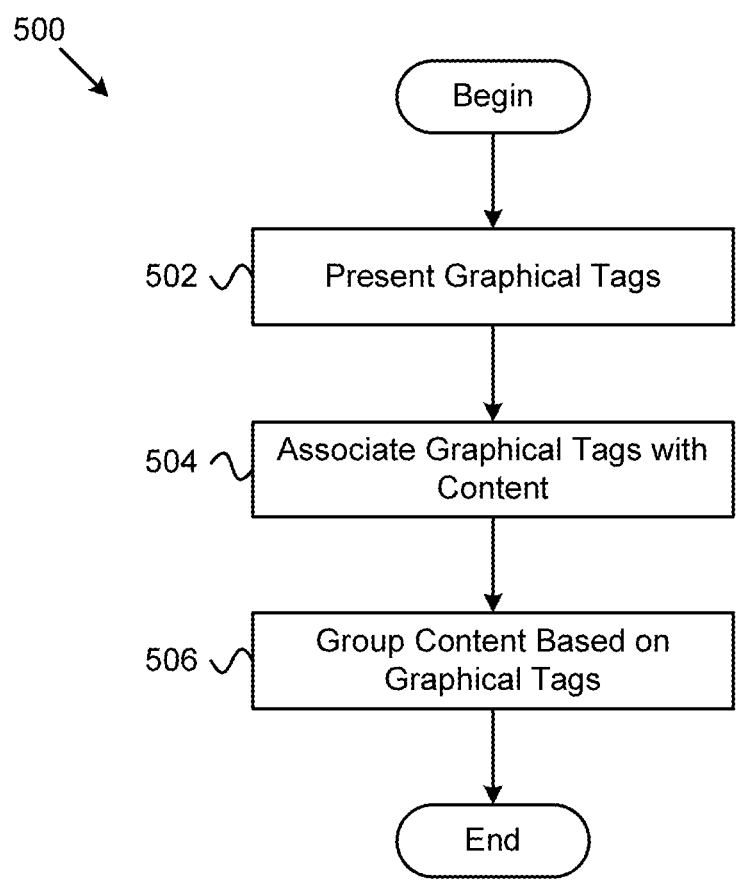
FIG. 5 is a flow chart diagram illustrating one embodiment of a method for content organization and categorization.

FIG. 5 is a schematic flow chart diagram illustrating one embodiment of a method 500 for content organization and categorization. In one embodiment, the method 500 begins and a tag module 202 presents 502 one or more graphical tags that are available to be associated with a content element. The assignment module 204, in one embodiment, associates 504 a graphical tag with the content element in response to a user interacting with the graphical tag, such as by dragging-and-dropping the graphical tag onto the content element. The grouping module 206, in some embodiments, groups 506 content elements based on the graphical tags associated with the graphical elements. For example, the grouping module 206 may group 506 content elements together that have the same family tag, and the method 500 ends.

Figure 6:
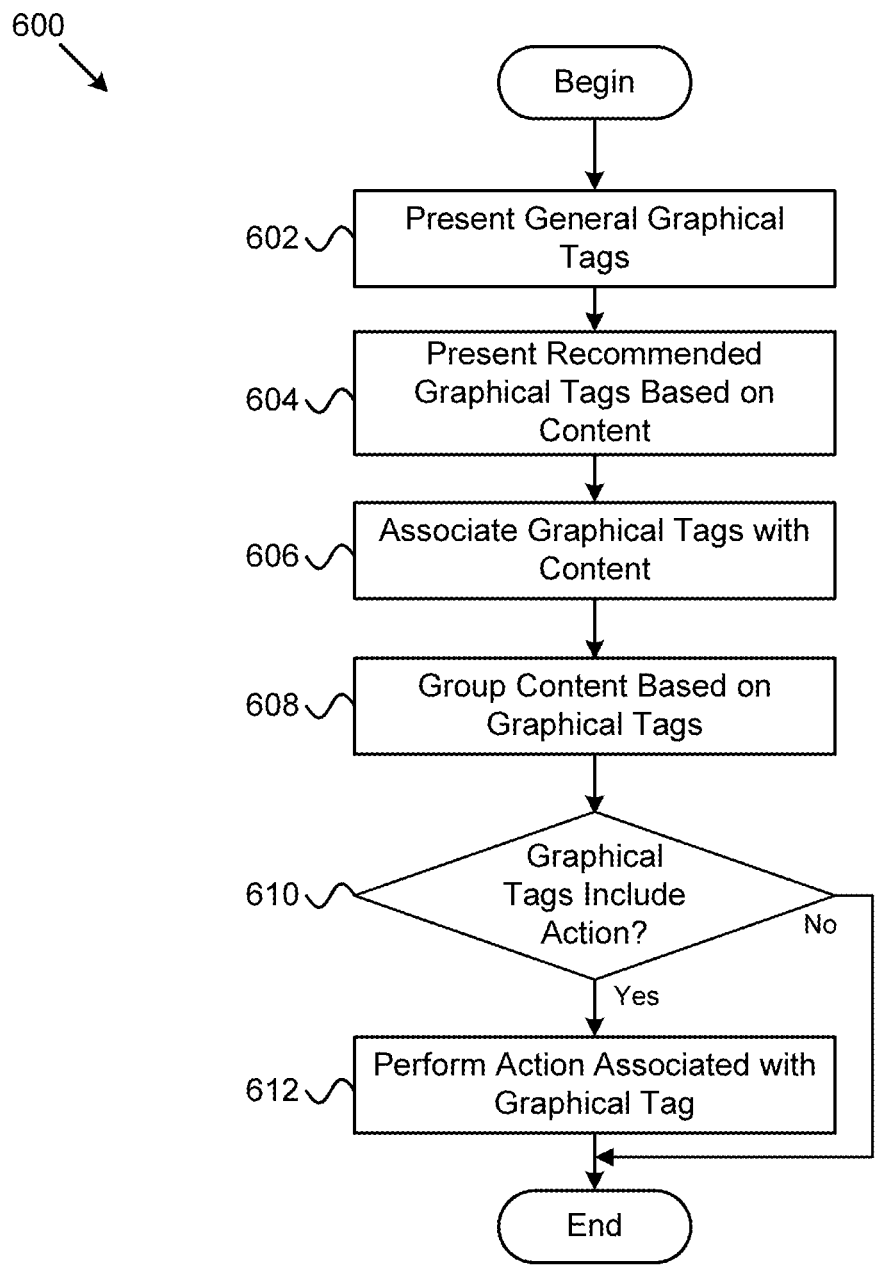
FIG. 6 is a flow chart diagram illustrating another embodiment of a method for content organization and categorization.

FIG. 6 is a schematic flow chart diagram illustrating another embodiment of a method 600 for content organization and categorization. In one embodiment, the method 600 begins and the tag module 202 presents 602 one or more available general-use graphical tags that may be associated with a content element. The recommendation module 306 may also present 604 one or more recommended graphical tags based on the type of content being presented. In some embodiments, the assignment module 204 associates 606 a graphical tag with a content element in response to user input.

In a further embodiment, the grouping module 206 groups 608 content elements based on the graphical tags associated with the content elements. In one embodiment, an action module 302 determines 610 whether a graphical tag includes an associated action. If so, the action module 302 performs 612 the action associated with the graphical tag. For example, the action module 302 may post an image to social network in response to a social graphical tag being associated with an image. Alternatively, the action module 302 may post the image to a social network in response to a user interacting with the graphical tag, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
determine a user's location in response to the user generating a content element;
determine one or more graphical tags that are associated with one or more attractions at the user's location, the one or more graphical tags hidden until the user's location satisfies a location of an attraction associated with the one or more graphical tags, wherein each of the one or more graphical tags comprises one or more of a graphical representation of metadata related to the content element, multimedia content, interactive content, and an action performed using the content element;
present the one or more graphical tags for the content element in response to the user's location satisfying the location of the attraction associated with the one or more graphical tags;
associate one or more graphical tags with the content element in response to the user flicking the one or more graphical tags on the content element using a flicking motion;
index one or more content elements based on the one or more graphical tags, wherein content elements having a same graphical tag are grouped together;
trigger one or more actions of a plurality of actions assigned to each of the one or more graphical tags associated with the content element in response to user input received on the one or more graphical tags after the one or more graphical tags is associated with the content element, wherein the one or more triggered actions are a subset of the plurality of actions assigned to each of the one or more graphical tags, the one or more actions selected in response to being usable with the content element type; and
recommend one or more other graphical tags for the content element based on the user's historical graphical tag associations for content elements that are of a similar type as the content element that the user generated.

2. The apparatus of claim 1, wherein the code is further executable by the processor to select one or more graphical tags for the content element based on one or more characteristics of the content element.

3. The apparatus of claim 1, wherein one or more graphical tags become available in response to a user completing one or more tasks associated with the one or more graphical tags.

4. The apparatus of claim 1, wherein the content element is one of a plurality of content elements comprising a collection, the graphical tag being associated with each content element in the collection in response to the graphical tag being associated with the collection.

5. The apparatus of claim 1, wherein the one or more graphical tags comprises one or more of predefined graphical tags and user-created graphical tags.

6. The apparatus of claim 1, wherein a graphical tag comprises one or more sub tags, the one or more sub tags being associated with a content element in response to the graphical tag being associated with the content element.

7. The apparatus of claim 1, wherein the code is further executable by the processor to arrange the one or more graphical tags into one or more tag categories based on a graphical tag type.

8. The apparatus of claim 1, wherein the one or more graphical tags represent an action in a game.

9. The apparatus of claim 1, wherein the code is further executable by the processor to create a graphical tag comprising one or more characteristics selected by a user.

10. The apparatus of claim 1, wherein the content element comprises one or more of a photograph, a video, an audio file, and a document.

11. A method comprising:
determining a user's location in response to the user generating a content element;
determining one or more graphical tags that are associated with one or more attractions at the user's location, the one or more graphical tags hidden until the user's location satisfies a location of an attraction associated with the one or more graphical tags, wherein each of the one or more graphical tags comprises one or more of a graphical representation of metadata related to the content element, multimedia content, interactive content, and an action performed using the content element;
presenting the one or more previously hidden graphical tags for a content element in response to the user's location satisfying the location of the attraction associated with the one or more graphical;
associating one or more graphical tags with the content element in response to the user flicking the one or more graphical tags on the content element using a flicking motion;
indexing one or more content elements based on the one or more graphical tags, wherein content elements having a same graphical tag are grouped together;
triggering one or more actions of a plurality of actions assigned to each of the one or more graphical tags associated with the content element in response to user input received on the one or more graphical tags after the one or more graphical tags is associated with the content element, wherein the one or more triggered actions are a subset of the plurality of actions assigned to each of the one or more graphical tags, the one or more actions selected in response to being usable with the content element type; and
recommending one or more other graphical tags for the content element based on the user's historical graphical tag associations for content elements that are of a similar type as the content element that the user generated.

12. The method of claim 11, further comprising selecting one or more graphical tags for the content element based on one or more characteristics of the content element.

13. The method of claim 11, wherein the content element is one of a plurality of content elements comprising a collection, the graphical tag being associated with each content element in the collection in response to the graphical tag being associated with the collection.

14. A computer program product comprising a computer readable storage medium having program code embodied therein, the program code readable/executable by a processor for:

determining a user's location in response to the user generating a content element;

determining one or more graphical tags that are associated with one or more attractions at the user's location, the one or more graphical tags hidden until the user's location satisfies a location of an attraction associated with the one or more graphical tags, wherein each of the one or more graphical tags comprises one or more of a graphical representation of metadata related to the content element, multimedia content, interactive content, and an action performed using the content element;

presenting the one or more previously hidden graphical tags for a content element in response to the user's location satisfying the location of the attraction associated with the one or more graphical tags;

associating one or more graphical tags with the content element in response to the user flicking the one or more graphical tags on the content element using a flicking motion;

indexing one or more content elements based on the one or more graphical tags, wherein content elements having a same graphical tag are grouped together;

triggering one or more actions assigned to each of the one or more graphical tags associated with the content element in response to user input received on the one or more graphical tags after the one or more graphical tags is associated with the content element, wherein the one or more triggered actions are a subset of the plurality of actions assigned to each of the one or more graphical tags, the one or more actions selected in response to being usable with the content element type; and recommending one or more other graphical tags for the content element based on the user's historical graphical tag associations for content elements that are of a similar type as the content element that the user generated.

* * * * *